United States Patent
Peddinghaus

[15] 3,651,902
[45] Mar. 28, 1972

[54] HYDROPNEUMATIC SHOCK ABSORBER

[72] Inventor: Carl Ullrich Peddinghaus, Obere Lichtenplatzer Str. 276, 56 Wuppertal-Barmen, Germany

[22] Filed: Dec. 15, 1969

[21] Appl. No.: 885,381

[52] U.S. Cl............................188/269, 188/314, 188/322
[51] Int. Cl...................................................F16f 9/40
[58] Field of Search...................................188/269, 322, 314

[56] References Cited

UNITED STATES PATENTS

| 3,168,169 | 2/1965 | Allinquant | 188/314 |
| 1,855,064 | 4/1932 | Messier | 188/314 X |
| 3,163,262 | 12/1964 | Allinquant | 188/314 X |

FOREIGN PATENTS OR APPLICATIONS

| 821,030 | 9/1959 | Great Britain | 188/314 |

Primary Examiner—George E. A. Halvosa
Attorney—Holman and Stern

[57] ABSTRACT

A hydropneumatic shock absorber having a working cylinder, a piston and a compensating chamber at one end of the working cylinder. The working cylinder and the compensating chamber are interconnected by a pair of pipes arranged so that the two pipe ends forming one pair of pipe ends are disposed at diametrically opposite positions. The diametrically opposite pipe ends communicate with the working cylinder and there is also provided an attachment member for use in mounting the shock absorber in its operative position in such a way that when the shock absorber is installed in a non-vertical orientation the diametrically opposite pipe ends can be arranged so that one of them is at the highest part of the working cylinder.

1 Claim, 3 Drawing Figures

PATENTED MAR 28 1972

3,651,902

INVENTOR
Carl Ullrich Peddinghaus
BY
ATTORNEYS

HYDROPNEUMATIC SHOCK ABSORBER

This invention relates to a hydropneumatic shock absorber of the kind having a working cylinder containing a damping fluid, a piston and a compensating chamber.

In hydropneumatic shock absorbers of the kind specified there is located in the compensating chamber damping fluid and a volume of pressurized gas, said pressurized gas keeping the damping fluid under pressure. There is, however, a tendency when the shock absorber (due to prolonged operating periods) is subjected to a rise in temperature for the damping fluid to absorb a part of the pressurized gas, which is then liberated when the shock absorber cools down. Due to this absorption of gas in the region of valve openings in the damping piston liberations of gas occur within the damping fluid, so that the valve characteristics are detrimentally affected, the reason being that the valve openings are dimensioned for the flow of damping fluid and put up considerable opposition to a mixture of damping fluid and gas.

The object of the invention is to construct a hydropneumatic shock absorber of the kind specified in an improved form. More specifically, it is an object of the invention to provide a hydropneumatic shock absorber in which the tendency for said pressurized gas to be absorbed by said damping fluid is inhibited.

Another object of the invention is to provide an improved construction of shock absorber of the kind referred to which can be mounted in a motor vehicle in an oblique position. An attachment member may be provided on the shock absorber and is generally constructed as an eye, so that in principle two constructional possibilities differing by a rotation of 180° result. If it is considered that hydropneumatic shock absorbers sometimes have to be exchanged after a long operating time in a motor vehicle, and that the installation position may also be changed in practice, then an embodiment according to the invention offers a particularly advantageous solution.

The invention will now be more particularly described with reference to the accompanying drawings wherein.

Figure 1:
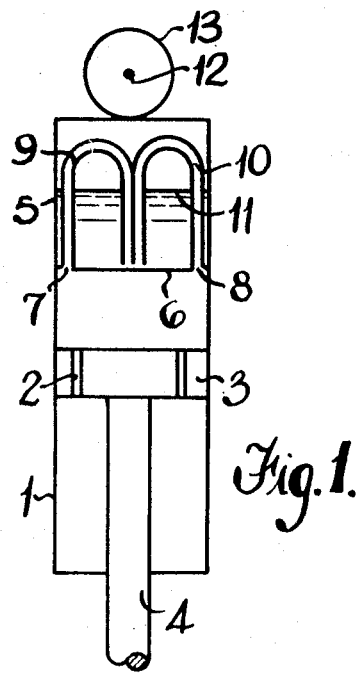
FIG. 1 is a diagrammatic illustration showing a hydropneumatic shock absorber.

Referring now more particularly to FIG. 1 of the drawings there is shown a hydropneumatic shock absorber consisting of a working cylinder 1, in which the damping piston 3, provided with valve openings 2, is displaceable. The damping piston 3 is connected to the piston rod 4 which at its lower end projects outwardly from the working cylinder 1. The upper end of the working cylinder is bounded by a disc 6 separating it from the compensating chamber 5 and at diametrically opposed points the disc 6 is provided with openings 7, 8 which communicate with one pair of ends of pipes 9 and 10 constructed as inverted U-shaped pipes. The other pair of ends of said pipes are disposed on or adjacent the longitudinal axis of the compensating chamber 5. Within the compensating chamber 5 there is provided a fluid, the upper level of which is indicated by the reference numeral 11 above which a volume of pressurized gas is located.

As shown in FIG. 1 the connecting line between the openings 7 and 8 is at right angles to the axis 12 of an attachment lug 13. Such an arrangement is thus appropriate if the shock absorber is to be installed in use on a vehicle in such a manner that the longitudinal axis of the working cylinder is vertically disposed. However, for the case where the working cylinder 1 is installed at an inclination to the aforementioned orientation, the connecting line between the openings 7 and 8 must be arranged in use with respect to the axis 12 such that one of the openings 7 or 8 is disposed at the highest point of the working cylinder 1. "This can be achieved by arranging that the axis 12 of the attachment lug or eye 13 always extends in a horizontal direction, the shock absorber being swung about said axis 12 before being secured in any desired position in which the axis of the cylinder 1 of the shock absorber extends in a direction inclined to the vertical. As will be seen from the drawings the openings 7 and 8 are arranged respectively at opposite ends of a diameter of the working cylinder 1 so that one of said openings 7 and 8 will always be at the highest point of the working cylinder 1 irrespective of the orientation said cylinder."

Figure 2:
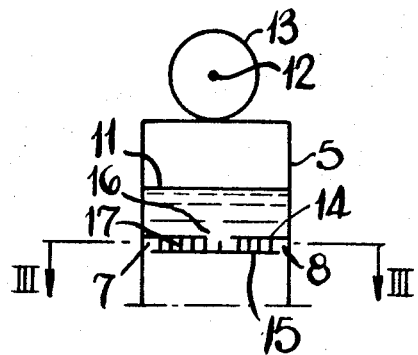
FIG. 2 is a fragmentary diagrammatic illustration of one embodiment of a shock absorber in accordance with the invention.

In FIG. 2, only the upper part of such a shock absorber is shown, the lower part being similar to the shock absorber shown in FIG. 1. However, as seen in FIG. 2, and in accordance with the invention, the working cylinder 1 is separated from the compensating chamber 5 by means of two discs 14 and 15 separated from each other. The lower disc 15 is provided with openings 7 and 8 at diametrically opposed points and a central opening is provided in the upper disc 14. At least one of the two discs 14, 15 is formed on its side adjacent the other disc with spiral webs which extend between the two discs and which are indicated by reference numeral 14 in FIG. 2. It is therefore possible to maintain a flow path of considerable length, inside which a laminar flow occurs. The two spiral flow paths terminate at the opening 16 leading into the compensating chamber 5 which is filled with damping fluid and pressurized gas. The opening 16 is constructed to be of an adequate cross-section so that the fluid leaves it at a low speed.

Figure 3:
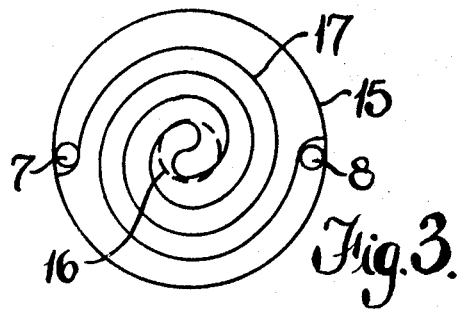
FIG. 3 is a sectional view of the invention shown in FIG. 2 taken along the line III and III'.

FIG. 3 is a cross-sectional view taken between the discs 14,15 wherein can be seen the two spiral paths. The openings 7 and 8 in the lower disc 15 are also shown. The webs 17 start from both openings 7, 8 and form the two spiral flow paths. For a better illustration, the outline of the opening 16 is shown in FIG. 3 by broken lines. In the region of this opening 16 the fluid flow undergoes a deviation through 90° before reaching the compensating chamber 5.

Having thus described my invention what I claim as new and desire to secure by Letters Patent is:

1. A hydropneumatic shock absorber comprising a working cylinder which contains a damping fluid, a damping piston displaceable therein, a compensating chamber adjoining one end of said working cylinder, a pair of spaced discs which extend in planes at right angles to the longitudinal axis of the hydropneumatic shock absorber and which separate said compensating chamber from said working cylinder, and an attachment member comprising an eye, wherein said damping piston is provided with valve openings, and a piston rod which projects outwardly from the other end of said working cylinder and wherein there is further provided only two connecting pipes between said working cylinder and said compensating chamber through which damping fluid can flow in both directions, one pair of ends of said connecting pipes opening out into said working cylinder and being disposed respectively at the ends of a diameter of said working cylinder which extends at right angles to the axis of said eye, said connecting pipes being constructed as spiral pipes defined by webs which extend between said discs.

* * * * *